Patented Feb. 21, 1933

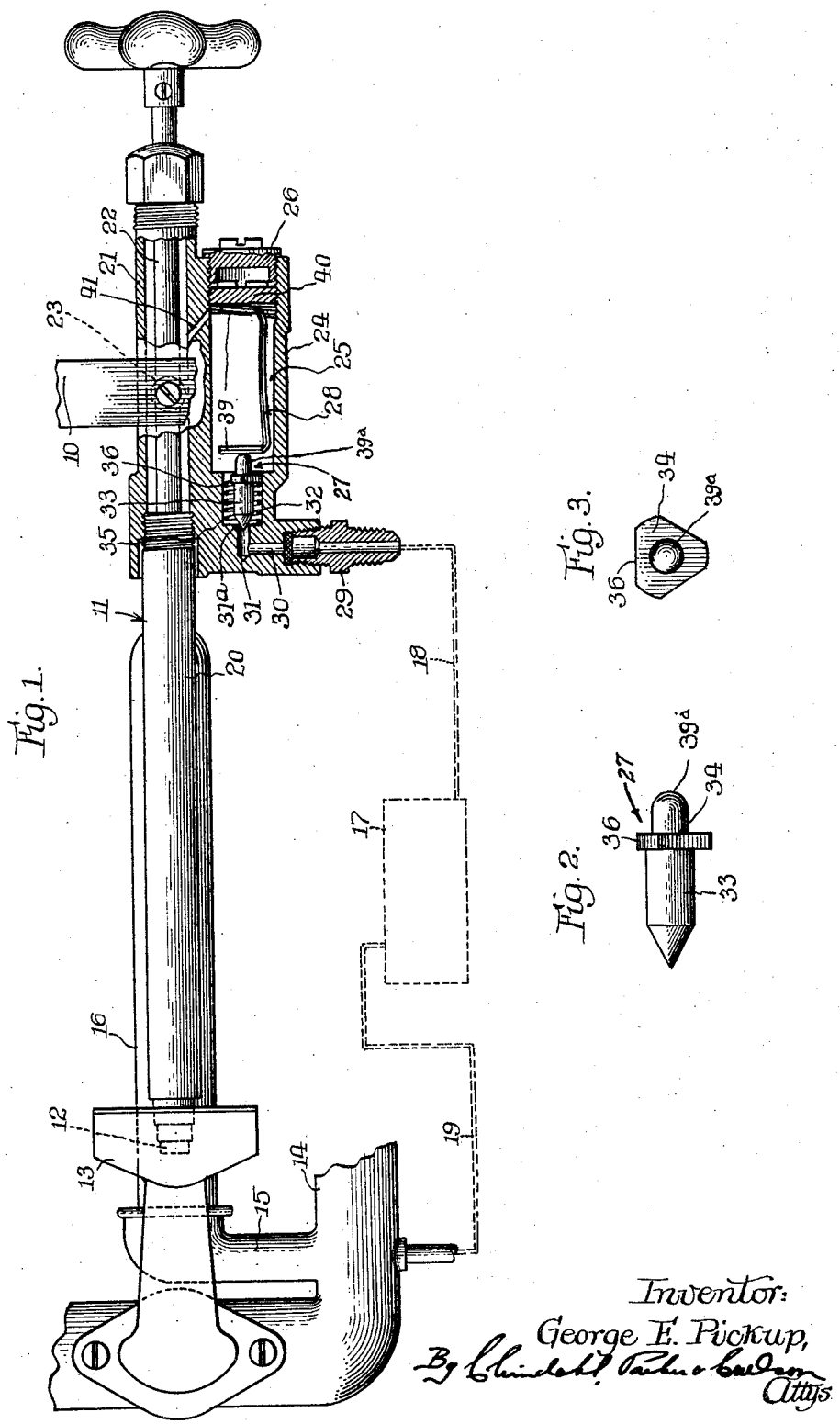

1,898,597

UNITED STATES PATENT OFFICE

GEORGE E. PICKUP, OF NEWARK, OHIO, ASSIGNOR TO THE WEHRLE COMPANY, OF NEWARK, OHIO, A CORPORATION OF OHIO

GENERATOR DEVICE FOR LIQUID FUEL STOVES

Application filed July 9, 1931. Serial No. 549,669.

The invention relates generally to generator devices for liquid fuel stoves utilized for converting liquid fuel into gaseous fuel upon application of heat to the generator.

An important object of the present invention is to provide a new and improved device of this character in which the flow of liquid fuel to the device is controlled by a thermally-responsive unit so located with respect to the generator that the unit is heated indirectly during the application of heat to the generator whereby the thermostatic unit is heated through a relatively small range and may therefore be made of a more sensitive character than heretofore.

Another object of the invention is to provide such a device embodying a novel arrangement of the thermal-responsive control unit in order that rapid cooling of the thermally-responsive unit will result when the source of heat fails to maintain the unit above a certain predetermined temperature.

Another object is to provide a generator device which may be readily assembled, or disassembled for inspection, and which is easily accessible from the front of the stove for adjusting the temperature of operation of the valve which controls the flow of liquid fuel.

Another object is to provide a device of this character which is simple, compact and sturdy in construction and which is efficient in operation.

In the drawing which illustrates a preferred embodiment of the invention,

Fig. 1 is a fragmental plan view of a stove having a generator embodying the features of the invention.

Figs. 2 and 3 are enlarged detail views of a part of the valve mechanism.

In the form chosen for disclosure herein, the invention is embodied in a stove having a frame 10 beneath which is mounted a generator device, designated generally by the numeral 11, within which liquid fuel is converted into gaseous fuel. Gaseous fuel produced within the generator 11 is discharged through a nozzle 12 into an air mixer 13 which communicates with a manifold 14. The manifold 14 communicates with a plurality of valve controlled cooking burners (not shown) and is in constant communication through a conduit 15 with a generator burner 16 located beneath the generator 11 for heating the same. Liquid fuel, under pressure in a closed tank 17, is conducted to the generator 11 through a conduit 18 for normal operation of the stove, while fuel vapor from the top of the tank 17 is conducted by a pipe 19 to the manifold 14 for use in pregeneration or initial heating of the generator 11.

In order that the initial heating of the generator 11 may be accomplished through the use of a minimum amount of fuel vapor, the flow of liquid fuel through the conduit 18 is preferably controlled by thermally-responsive means so as to prevent the passage of liquid fuel into the generator until the generator has been heated to a temperature sufficient to vaporize such liquid fuel. Through the use of such a flow control means, the flow of fuel is terminated as soon as the generator cools so as to prevent flooding of the manifold with liquid fuel. This, of course, renders the apparatus safe in its operation.

The generator 11 as herein illustrated comprises an elongated tube 20, upon one end of which the nozzle 12 is mounted, and upon the other or forward end of which is screw threaded a suitable tubular extension or fitting 21 which forms a continuation of the generator tube 20. A valve rod 22 extending through the generator tube 20 and fitting 21 provides for control of the nozzle 12 in the conventional manner. The fitting 21 is provided with a lug 23 through the medium of which the fitting may be secured to the stove frame 10.

Intimately associated with the fitting 21 and preferably formed integrally therewith is a tubular housing 24 extending parallel to the generator tube 20 and providing a cylindrical chamber 25 opening toward the forward end of the fitting 21 and closed by a screw threaded plug 26. The chamber 25 preferably constitutes a part of the liquid fuel supply passage and also serves to receive a control valve 27 and a thermally-responsive device 28 for controlling the valve.

To supply liquid fuel to the generator, a nipple 29 connects the conduit 18 to a transverse passage 30, formed adjacent the rear end of the housing 24, and the passage 30 communicates with a bore 31 formed as a reduced axial extension of the rear end of the chamber 25. The forward end of the bore 31 provides a seat 31$^a$ for the pointed end of the valve 27 which is moved forwardly away from the seat to permit passage of liquid fuel from the conduit 18 into the chamber 25. Such opening movement of the valve 27 is obtained by an expansive coiled spring 32 under the control of the thermally-responsive device 28.

In the form herein shown, the valve 27 comprises a cylindrical portion 33, one end of which is pointed as above described for cooperation with the valve seat 31$^a$, and the other end of which has a disk 34 formed thereon as shown in Fig. 3 so that the disk 34 may engage the side walls of the housing 24 in a reduced portion 35 thereof to position that end of the valve. The other or pointed end of the valve is slidably supported for engagement with the valve seat 31$^a$ by projection of the pointed end into the bore 31. The actuating spring 32 is located in the reduced portion 35 of the housing and surrounds the portion 33 of the valve between the end of the bore 31 and the disk 34 so that the spring tends to move the valve away from its seat and toward the forward end of the chamber 25.

In order to permit passage of fuel from the bore 31 into the forward portion of the chamber 25, the disk 34 has peripherally spaced segments cut from its edge as shown at 36 in Fig. 3.

Such opening movement of the valve 27 is controlled by the thermally-responsive element 28 which in the present instance is in the form of a bimetallic strip having its ends bent to provide laterally projecting arms 39, one of which bears against an axial boss 39$^a$ formed on the forward side of the disk 34 of the valve member. The other arm 39 of the thermostatic element bears at its end against a screw threaded disk 40, positioned in the forward end of the chamber 25. When the plug 26 is removed, the disk 40 may be adjusted longitudinally of the chamber 25 to vary the temperature at which the valve 27 may be opened.

The main body of the element 28 is positioned adjacent to the wall of the chamber 25 and may at its normal temperature be slightly bowed toward the axis or center line of the chamber. When the element 28 is heated the main body thereof tends to become straight and this action moves the ends of the two arms 39 toward each other so as to permit the valve to be opened by the spring 32. Adjacent to the forward end of the chamber 25 and just rearwardly of the adjusting disk 40 an angular bore 41 is formed in the fitting 21 to provide for passage of liquid fuel from the chamber 25 into the bore of the fitting 21 from which it may pass into the generator tube 20.

By using a bimetallic thermostatic element with arms 39 at opposite ends to contact the abutment 40 and the valve 27, the bowing action of the central portion of the element is utilized to materially multiply the expansion of the parts of the element, and as a result it is possible to obtain the requisite valve movement longitudinally of the chamber 25 with a thermostatic element of comparatively small dimensions. This contributes to the production of a compact control means for the generator unit. Also, it will be apparent that this form of thermostatic element makes use of the expansion of the metal to reduce the distance between the two ends of the arms 39, and because of this action it is possible to use a valve inserted from the front of the fitting 24 to cooperate with a forwardly facing valve seat at the rear end of the fitting.

It will be seen that with the construction above described the thermally-responsive device 28 is constantly cooled at all times by the liquid fuel flowing through the chamber 25, and that as a result the element 28 will be cooled rapidly and the valve 27 closed when the generator burner 16 fails for any reason to maintain the generator tube 20 at a predetermined temperature sufficiently high to gasify the liquid fuel. This temperature may be readily adjusted from the front of the stove by removal of the plug 26 and rotation of the adjusting disk 40 as by means of a screw driver.

Since the thermostatic element 28 is heated only by conduction of the heat through the metallic tube 20 and the fitting 21 it will be seen that the element 28 may be of a sensitive character.

I claim as my invention:

1. A gas generator for liquid fuel stoves comprising, in combination, a generator tube, a casing formed on one side of said tube adjacent the forward end thereof to provide a chamber opening forwardly of said tube, a removable plug closing the forward end of the chamber, a passageway connecting the rear end of said chamber with a source of liquid fuel, a valve in said chamber controlling said passageway, a thermostatic element in said chamber controlling said valve, and an adjustable member in the forward end of said chamber against which said element acts, said casing having an opening into said tube from said chamber located just rearwardly of said adjustable member.

2. A gas generator for liquid fuel stoves comprising, in combination, a hollow generator tube, a casing attached to said generator tube adjacent to the forward end thereof and providing an elongated chamber opening forwardly of said tube, removable means closing the forward end of said chamber, said chamber having an inlet opening at its rear end through which fuel may enter said chamber and an opening adjacent to its forward end through which fuel may pass from the chamber into said tube, a valve for controlling said inlet opening comprising an elongated body with an enlarged head at one end slidably engaging the sides of said chamber, and having its other end extending into and guided by said inlet opening, said head being shaped to permit passage of fuel through said chamber, an expansive spring surrounding said body and acting between said head and an abutment in said chamber to press the valve forwardly of the chamber, and a thermostatic element in the forward end of said chamber acting on said head to control movement of said valve.

3. A gas generator device for liquid fuel stoves comprising a hollow generator, a fitting associated therewith through which liquid fuel is supplied to said generator, said fitting having a chamber formed therein with an open end, means for closing said end, an inlet port for said chamber facing toward the open end of the chamber to form a valve seat, a valve movable toward and away from said seat and insertable through the open end of the chamber, and a thermostatic element and a spring also insertable through said open end of the chamber and acting in opposition to each other to control the position of said valve.

4. A gas generator for liquid fuel stoves comprising a generator tube, a fitting at the forward end of said tube having a chamber therein communicating with said tube, said chamber having a fuel inlet at one end thereof and being open at the other end, a cover screw threaded to said other end for closing the chamber, a valve member for controlling said fuel inlet insertable into said chamber through said open end, a thermostatic element in said chamber in controlling relation to said valve and also insertable through said open end, and an adjusting member screw threaded into said open end of the chamber and accessible when said cover is removed to vary the temperature of operation of said valve.

5. A gas generator for liquid fuel stoves comprising, in combination, a generator tube, an elongated casing associated with said tube and communicating therewith, said casing having an inlet opening adjacent one end thereof through which liquid fuel may be supplied to said tube, a valve member movable longitudinally of said casing to control said opening, and thermally responsive means for controlling said valve comprising a bimetallic strip within said casing and extending longitudinally thereof, and arms on said strip projecting laterally therefrom and bearing respectively against said valve and a part of said casing.

6. A gas generator for liquid fuel stoves comprising, in combination, a generator, means providing a passage for conducting liquid fuel to the generator, a movable valve for controlling said passage, and thermally responsive means for controlling said valve comprising a bimetallic strip bent at its ends to form laterally projecting arms, one of which is operatively associated with said valve, and abutment means against which the other of said arms may bear.

7. A gas generator device for liquid fuel stoves comprising a generator, a passage for conducting liquid fuel to the generator, a valve controlling said passage, a spring for opening the valve, a bimetallic element having its ends bent to form laterally projecting arms, said element being arranged when heated to bend and draw the ends of said arms toward each other, and one of said arms being arranged to bear against said valve in opposition to said spring and abutment means against which the other arm of said element bears.

8. The combination with a gaseous fuel burner of a generator for converting liquid fuel into a gas for delivery to said burner comprising a hollow metallic tube overlying said burner and having a discharge orifice at one end, a metallic fitting having an elongated bore into one end of which the end of the tube opposite the discharge orifice is entered, a needle valve for said discharge orifice having an operating rod extending through said tube and said fitting, said fitting having a lateral extension providing an elongated chamber at one side of said bore and extending parallel therewith in a direction opposite the tube, said fitting further having an inlet passage for connection with a liquid fuel source and an outlet passage communicating with said bore, a valve member for controlling the flow of liquid fuel from said inlet passage, a spring tending to open said valve member, and a thermostatic element in said chamber adapted to receive heat from said burner by conduction through said tube and fitting, said element acting automatically when the burner is extinguished to move said valve member positively into closed position.

9. The combination with a gaseous fuel burner of a generator for converting liquid fuel into a gas for delivery to said burner, comprising a hollow metallic tube overlying said burner and having a discharge orifice at one end, a metallic fitting having an elongated bore into one end of which the end of the tube opposite the discharge orifice is inserted, a needle valve for said discharge orifice having an operating rod extending through said tube and said fitting, said fitting having a lateral extension providing an elongated chamber at one side of said bore with an inlet passage for connection with a liquid fuel source and an outlet passage communicating with said bore, valve means for controlling the flow of liquid fuel from said inlet passage to said chamber, and a thermostatic element in the chamber for actuating said valve means, said element being adapted to receive heat from said burner by conduction through said tube and fitting and said chamber having the inlet and outlet passages spaced apart so as to cause the liquid fuel to transverse said thermostatic element in the normal passage of the fuel through the generator tube.

In testimony whereof, I have hereunto affixed my signature.

GEORGE E. PICKUP.